3,077,469
PHOSPHONIUM STARCH ETHERS
Adorian Aszalos, Vienna, Austria, assignor to National Starch and Chemical Corporation, New York, N.Y., a corporation of Delaware
No Drawing. Filed June 28, 1961, Ser. No. 120,169
2 Claims. (Cl. 260—233.3)

This invention relates to a new class of starch derivatives. More specifically, it relates to a method for making phosphonium ethers of starch, and to the valuable products thus produced.

I have discovered that when starch is reacted with an etherification reagent containing a phosphonium group, there results a starch ether which contains the phosphonium group and which is characterized by surprisingly improved properties. One of the most interesting of these improved properties is viscosity-stability. Thus, it is known that starch, such for example as corn starch, when cooked (i.e. gelatinized) in water and cooled ordinarily sets up to a solid or semi-solid gel. This change in viscosity from a fluid product to a solid mass is highly disadvantageous for many industrial applications. On the other hand, it has been found that the phosphonium starch ether (that is, the starch which as been etherified with a phosphonium-containing etherification reagent) may be cooked in water and even upon cooling remains a non-gelled fluid, without appreciable change in viscosity. I refer to this resistance to gelling as "viscosity-stability."

Another improved characteristic of my phosphonium starch ethers is that they are cationic; that is, they bear a positive electrical charge. This gives them a natural affinity for negatively charged substances, such for example as cellulose fibers, indicating their value in the sizing of textiles and paper. This same characteristic also points to their use in pharmaceutical and biological applications, where the cationic property is of value.

By "starch" I mean starch derived from any vegetable source, including corn, tapioca, potato, waxy maize, sorghum, wheat, rice or sago, as well as any substances which are essentially amylaceous in nature.

By "phosphonium compounds" I refer to any organic compounds which contain phosphorus bound by covalent bonds to four organic radicals, which may be alkyl, aryl, aralkyl, cycloalkyl or heterocyclic groups. In order to serve as an etherifying agent, capable of reacting with the hydroxyl groups of starch, the phosphonium compound must contain a halogen, epoxy or vinyl group. Thus, the phosphonium compounds suitable for use in my invention may be described diagrammatically as:

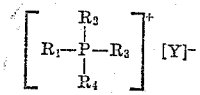

where $R_1$ is a radical selected from the class consisting of alkyl, aryl, aralkyl and cycloalkyl radicals which contain a halogen, epoxy or vinyl group capable of reacting with the hydroxyls of starch, and each of $R_2$, $R_3$ and $R_4$ is a radical selected from the class consisting of alkyl, aryl, aralkyl, cycloalkyl and alkylene phosphonium radicals, and in which Y may be any anion.

Representative examples of such reagents are the beta-halogenoalkyl phosphonium salts, such as 2-chloroethyl tributyl phosphonium chloride. Other etherification reagents, containing the phosphonium moiety as well as a reactive group capable of reacting through an ether linkage with the hydroxyl of the starch, will be apparent to the practitioner.

The reaction is best carried out by suspending the starch in water, containing dissolved therein an alkali which serves to catalyze the reaction, and adding the reagent. The alkali may be an alkali metal hydroxide or alkaline earth hydroxide or other strongly basic substance. The reaction may take place at room temperature, although slightly elevated temperatures may sometimes serve to speed the reaction.

If the amounts of alkali present in the reaction mass is such as would ordinarily tend to gelatinize the starch, and if it is desired to obtain the starch ether in the ungelatinized granule form, then one may add a known gelatinization inhibitor, such for example as sodium sulfate. It is preferable that the product be obtained in ungelatinized form, because it is then easily recovered from the reaction mass by filtration. However, the reaction may be conducted upon gelatinized starch, or the starch may be gelatinized in the course of the reaction, or the final phosphonium-containing starch derivative may be gelatinized, as by passing an aqueous suspension of said starch over heated drums or other suitable means.

As for proportions, the alkali should be present in an amount to maintain the reaction mass in an alkaline state throughout the reaction. The amount of phosphonium etherification reagent may vary over a wide range, depending upon the degree of substitution desired. Thus, I have obtained improvement in non-gelling characteristics by reacting starch with as little as 0.5% of the reagent, based on the dry starch weight, and on the other hand have used as much as 16% of the reagent and higher, successfully.

The starch derivatives of my invention may be described by the structural formula:

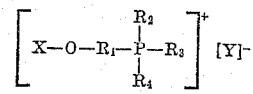

wherein X is starch; $R_1$ is a radical selected from the class consisting of alkylene, hydroxyalkylene, aralkylene, cycloalkylene and arylene radicals; each of $R_2$, $R_3$ and $R_4$ is a radical selected from the class consisting of alkyl, aryl, aralkyl, cycloalkyl and alkylene phosphonium radicals, and Y may be any anion.

The following examples will further illustrate the embodiment of my invention. Unless otherwise indicated, all parts are given by weight.

Example I

This example illustrates the preparation of a typical phosphonium etherification reagent.

40 parts of tributylphosphine was added to a solution of 20 parts of 2-chloroethanol in 20 parts of absolute ethanol, in a pressure vessel. Care was taken to protect the tributylphosphine from the air, and therefore the operation was conducted under a blanket of nitrogen. The vessel was closed and the contents heated and agitated at 100° C. for 7 hours and then at 110° C. for 9 hours. The reaction mixture, a colorless, viscous product, was then distilled in vacuo. The first fraction, recovered at 23–27° C. was believed to be ethanol. The second fraction (recovered at 27–30° C.) was believed to be 2-chloroethanol. The residue was 2-hydroxyethyl tributyl phosphonium chloride, a yellow, viscous liquid. This latter product was then treated with 30 parts of thionyl chloride, the mix being agitated for 30 minutes while immersed in an ice-water bath. The reaction mixture was then allowed to reach room temperature and heated below reflux for 2 to 3 hours. The mix was then refrigerated for several days and then extracted with ether (the ether extract being discarded). The residue, a viscous yellow liquid, was 2-chloro-ethyl tributyl phosphonium chloride, useful as an etherification reagent in the process of this invention.

Example II

This example illustrates the treatment of starch with a phosphonium-containing etherification reagent, to produce a phosphonium starch ether.

(a) 1.5 parts sodium hydroxide and 30 parts sodium sulfate were dissolved in 75 parts water. In this solution I then suspended 50 parts of corn starch. I then added 4 parts of a phosphonium-containing etherification reagent, 2-chloroethyl tributyl phosphonium chloride, and permitted the slurry to stand overnight, with stirring, at 45° C. The pH of the reaction mass was then adjusted from a pH of about 11.3 to 3.5, using dilute HCl, and the ungelatinized starch ether was recovered by filtration and washing with water and acetone, followed by air drying.

When a sample of the above starch derivative was cooked in water, in the proportion of 1 part starch to 14 water, and compared to an untreated corn starch cooked in water in the same proportions, it was found that the starch derivative of our invention produced a sol which did not gel to a solid mass upon cooling, as did an ordinary cooked corn starch. Testing in an electrophoresis apparatus indicated that the starch ether was cationic in nature.

(b) The above-described reaction between starch and the etherification agent was repeated, except that I employed 8 parts of the etherification reagent instead of 4 parts. The resulting starch ether, when cooked in water (1:14) produced a sol which was somewhat heavier, when hot, than the sol resulting from cooking (a) above. However, upon cooling it exhibited the same resistance to gelling.

Example III

This example illustrates a reaction catalyzed by an alkaline earth hydroxide.

To a slurry of 50 parts of corn starch in a suspension of 1.5 parts calcium hydroxide in 75 parts water, I added 4 parts of 2-chloroethyl tributyl phosphonium chloride. The mixture was allowed to stand overnight, with stirring, at room temperature. It was then adjusted to pH 3.5, with dilute HCl. The starch ether was filtered off, washed with water and acetone, and air dried. When cooked in 14 parts of water, there resulted a thin, fluid sol which did not gel upon cooling.

Variations in materials, proportions and procedures will be apparent to the practitioner in the art, without departing from the scope of the invention, which is limited only by the following claims.

I claim:

1. An etherification product of starch having the following structural formula:

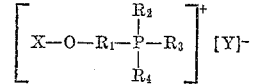

wherein X is starch; $R_1$ is a radical selected from the class consisting of alkylene, hydroxyalkylene, aralkylene, cycloalkylene and arylene radicals; each of $R_2$, $R_3$ and $R_4$ is a radical selected from the class consisting of alkyl, aryl, aralkyl, cycloalkyl and alkylene phosphonium radicals, and Y is any anion.

2. An ungelatinized etherification product of starch having the following structural formula:

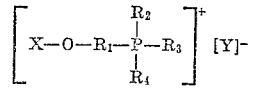

wherein X is starch; $R_1$ is a radical selected from the class consisting of alkylene, hydroxyalkylene, aralkylene, cycloalkylene and arylene radicals; each of $R_2$, $R_3$ and $R_4$ is a radical selected from the class consisting of alkyl, aryl, aralkyl, cycloalkyl and alkylene phosphonium radicals, and Y is any anion, said product being characterized by the retention of the original ungelatinized granular structure of the starch.

References Cited in the file of this patent

UNITED STATES PATENTS

| | | |
|---|---|---|
| 2,268,126 | Orthner et al. | Dec. 30, 1941 |
| 2,989,520 | Rutenberg et al. | June 20, 1961 |